(12) United States Patent
Grove et al.

(10) Patent No.: US 7,136,065 B1
(45) Date of Patent: Nov. 14, 2006

(54) REFINEMENT OF TRANSMITTED POLYGONAL MESH DATA

(75) Inventors: Jonathan Gordon Grove, Hampshire (GB); Sean Tristram Ellis, Hampshire (GB); Paul Charles Gregory, Hampshire (GB)

(73) Assignee: Superscape Group, PLC, Hampshire (GB)

( * ) Notice: Subject to any disclaimer, the term of this patent is extended or adjusted under 35 U.S.C. 154(b) by 384 days.

(21) Appl. No.: 10/129,451

(22) PCT Filed: Nov. 6, 2000

(86) PCT No.: PCT/GB00/04247

§ 371 (c)(1),
(2), (4) Date: Oct. 16, 2002

(87) PCT Pub. No.: WO01/33512

PCT Pub. Date: May 10, 2001

(30) Foreign Application Priority Data

Nov. 5, 1999 (GB) .................................. 9926131.5

(51) Int. Cl.
*G06T 17/00* (2006.01)
*G06T 15/00* (2006.01)
(52) U.S. Cl. ....................................... 345/428; 345/419
(58) Field of Classification Search ................ 345/428, 345/423, 420, 419
See application file for complete search history.

(56) References Cited

U.S. PATENT DOCUMENTS

| | | | | |
|---|---|---|---|---|
| 5,581,673 A | * | 12/1996 | Kikuchi | ...................... 345/423 |
| 5,886,702 A | * | 3/1999 | Migdal et al. | .............. 345/423 |
| 5,949,425 A | * | 9/1999 | Willis | ......................... 345/428 |
| 6,046,744 A | * | 4/2000 | Hoppe | ........................ 345/419 |
| 6,130,673 A | * | 10/2000 | Pulli et al. | .................. 345/428 |
| 6,426,750 B1 | * | 7/2002 | Hoppe | ........................ 345/428 |
| 6,525,727 B1 | * | 2/2003 | Junkins et al. | .............. 345/423 |
| 6,553,337 B1 | * | 4/2003 | Lounsbery | ..................... 703/2 |
| 2001/0002131 A1 | * | 5/2001 | DeRose et al. | ............. 345/423 |

OTHER PUBLICATIONS

Hugues Hoppe, "Progressive meshes", International Conf on Computer Graphics and Inter. Techn archive, Proc of the 23rd annual conf on Computer graphics and inter. techn, pp. 99-108, Pub: 1996, ISBN:0-89791-746-4.*

Andrew E. Johnson and Martial Hebert, "Control of Polygonal Mesh resolution for 3-D Computer Vision," Graphical Models and Imaging Processing, 1998, 261-285.*

* cited by examiner

Primary Examiner—Ulka Chauhan
Assistant Examiner—Daniel Hajnik
(74) Attorney, Agent, or Firm—Oppenheimer Wolff & Donnelly LLP

(57) ABSTRACT

A distributed computer system comprises a first computer and a second computer. The system is arranged for a digital image to be transmitted from the first computer to the second computer, via a telecommunications link, as plurality of co-ordinates defining, in three-dimensional space, the vertices of a plurality of polygonal surface facets of the image. The second computer is arranged to enhance the image by modifying the image according to the co-ordinates of said vertices. Only a small amount of data need therefore be transmitted from the first computer to the second computer for a high resolution image to be displayed by the latter.

12 Claims, 8 Drawing Sheets

REFINEMENT OF TRANSMITTED POLYGONAL MESH DATA

The present invention relates to a method and apparatus for distributing and displaying digital images.

It is known to provide a distributed computer network wherein a digital image is transmitted, on demand, from a first computer to a second computer.

However, for a high resolution image stored in a conventional format, the time taken to transmit the data defining that image can often be unacceptably high. This problem is exacerbated where an animated display of a three-dimensional object is to be provided, as a plurality of different images of the object must be transmitted over the network.

We have now devised an arrangement which overcomes the drawbacks associated with existing distributed computer networks in the transmission and display of digital images.

According to one aspect of the present invention, there is provided a distributed computer system comprising a first computer and a second computer and arranged for a digital image to be transmitted from the first computer to the second computer, via a telecommunications link, as a plurality of co-ordinates defining, in three-dimensional space, the vertices of a plurality of polygonal surface facets of the image, wherein the second computer is arranged to enhance the image by modifying the image according to the co-ordinates of said vertices.

Thus, very little data need be transmitted from the first computer to the second computer for the latter to provide a high-resolution display of a three-dimensional object.

It will also be appreciated that the transmitted image may be readily manipulated, by applying appropriate transformation algorithms to the co-ordinates of the vertices, to display an object from various different aspects. Thus, an animated display of an object may be generated by the second computer from only a very small amount of transmitted data.

Various methods have hitherto been proposed for enhancing the display of a multi-faceted digital image, by varying the co-ordinates of the vertices of that image and by introducing new vertices between existing vertices to subdivide the polygonal facets of the image.

However, as will be described in more detail hereinafter, existing image enhancement methods typically introduce undesirable surface artefacts into the displayed image. Such effects are particularly apparent where the division of a symmetrical surface into triangular facets is not correspondingly symmetrical, and even more so where different surface regions of the image are to be displayed in different colours.

According to the present invention, this drawback is preferably overcome by associating at least one variable with each polygonal edge joining together two vertices and by modifying the image according to the values of those variables.

Preferably the image is modified by varying the co-ordinates of its existing vertices, the new co-ordinates of each existing vertex being determined by:
   the co-ordinates the vertex itself; and
   the co-ordinates of vertices neighbouring the vertex,
   according to the values of the variables associated with each of the polygon edges which join the vertex to those neighbouring vertices.

Preferably the image is modified by introducing new vertices between existing vertices to subdivide the polygonal facets of the image, the co-ordinates of each new vertex being determined by:
   the co-ordinates of the existing vertices; and
   the co-ordinates of vertices neighbouring said existing vertices,
   according to:
   the value of a variable associated with the polygon edge which joins together said existing vertices; and
   the values of the variables associated with the polygon edges which join said existing vertices to neighbouring vertices thereof.

Preferably a respective value is assigned to a variable associated with each new edge formed, that value being determined by the values of the same variable associated with existing edges in its vicinity.

Preferably a normal to each vertex is determined by the co-ordinates of vertices neighbouring that vertex and by the values of the variables associated with the polygon edges which join the vertex to those neighbouring vertices.

Initial values may be assigned to the variables associated with the polygon edges by the second computer or those values may be transmitted from the first computer to the second computer.

According to a further aspect of the present invention, there is provided a computer arranged to transmit, via a telecommunications link, a plurality of co-ordinates defining, in three-dimensional space, the vertices of a plurality of polygonal surface facets of an image.

Preferably the computer is arranged to establish whether a receiving computer is provided with a computer program adapted to modify said co-ordinates to enhance said image is present on said receiving computer and, if not present, transmitting such a program to said receiving computer.

According to a further aspect of the present invention, there is provided a computer program for operating a computer to transmit, via a telecommunications link, a plurality of co-ordinates defining, in three-dimensional space, the vertices of a plurality of polygonal surface facets of an image.

Preferably the computer program is arranged for operating said computer to establish whether receiving computer is provided with a computer program adapted to modify said co-ordinates to enhance said image is present on said receiving computer and, if not present, transmitting such a program to said receiving computer.

According to a further aspect of the present invention, there is provided a computer arranged to receive, via a telecommunications link, a plurality of co-ordinates defining, in three-dimensional space, the vertices of a plurality of polygonal surface facets of an image, and to enhance the image by modifying the image according to the co-ordinates of said vertices.

Preferably the image is modified by varying the co-ordinates of its existing vertices, the new co-ordinates of each existing vertex being determined by:
   the co-ordinates the vertex itself; and
   the co-ordinates of vertices neighbouring the vertex,
   according to the values of at least one respective variable associated with each of the polygon edges which join the vertex to those neighbouring vertices.

Preferably the image is modified by introducing new vertices between existing vertices to subdivide the polygonal facets of the image, the co-ordinates of each new vertex being determined by:
   the co-ordinates of the existing vertices; and
   the co-ordinates of vertices neighbouring said existing vertices,
   according to:
   the value of a variable associated with the polygon edge which joins together said existing vertices; and the values of variables associated with the polygon edges which join said existing vertices to neighbouring vertices thereof.

Preferably a respective value is assigned to a variable associated with each new edge formed, that value being determined by the values of the same variable associated with existing edges in its vicinity.

Preferably a normal to each vertex is determined by the co-ordinates of vertices neighbouring that vertex and by the values of variables associated with the polygon edges which join the vertex to those neighbouring vertices.

According to a further aspect of the present invention, there is provided a computer program for operating a computer to receive, via a telecommunications link, a plurality of co-ordinates defining, in three-dimensional space, the vertices of a plurality of polygonal surface facets of an image, and to enhance the image by modifying the image according to the co-ordinates of said vertices.

Preferably the computer program is arranged such that the image is modified by varying the co-ordinates of its existing vertices, the new co-ordinates of each existing vertex being determined by:

the co-ordinates the vertex itself; and the co-ordinates of vertices neighbouring the vertex, according to the values of at least one respective variable associated with each of the polygon edges which join the vertex to those neighbouring vertices.

Preferably the computer program is arranged such that the image is modified by introducing new vertices between existing vertices to subdivide the polygonal facets of the image, the co-ordinates of each new vertex being determined by:

the co-ordinates of the existing vertices; and the co-ordinates of vertices neighbouring said existing vertices, according to:

the value of a variable associated with the polygon edge which joins together said existing vertices; and the values of variables associated with the polygon edges which join said existing vertices to neighbouring vertices thereof.

Preferably the computer program is arranged such that a respective value is assigned to a variable associated with each new edge formed, that value being determined by the values of the same variable associated with existing edges in its vicinity.

Preferably the computer program is arranged such that a normal to each vertex is determined by the co-ordinates of vertices neighbouring that vertex and by the values of variables associated with the polygon edges which join the vertex to those neighbouring vertices.

According to a further aspect of the present invention, there is provided a computer arranged to enhance a digital image stored in a memory thereof as a plurality of co-ordinates defining, in three-dimensional space, the vertices of a plurality of polygonal surface facets of the image, each polygon edge joining together two vertices having at least one variable associated therewith, wherein the image is enhanced by modifying the image according to the co-ordinates of said vertices and to the values of the variables associated with said polygon edges.

Preferably the image is modified by varying the co-ordinates of its existing vertices, the new co-ordinates of each existing vertex being determined by:

the co-ordinates the vertex itself; and the co-ordinates of vertices neighbouring the vertex, according to the values of the variables associated with each of the polygon edges which join the vertex to those neighbouring vertices.

Preferably the image is modified by introducing new vertices between existing vertices to subdivide the polygonal facets of the image, the co-ordinates of each new vertex being determined by:

the co-ordinates of the existing vertices; and the co-ordinates of vertices neighbouring said existing vertices, according to:

the value of a variable associated with the polygon edge which joins together said existing vertices; and the values of the variables associated with the polygon edges which join said existing vertices to neighbouring vertices thereof.

Preferably a respective value is assigned to a variable associated with each new edge formed, that value being determined by the values of the same variable associated with existing edges in its vicinity.

Preferably a normal to each vertex is determined by the co-ordinates of vertices neighbouring that vertex and by the values of the variables associated with the polygon edges which join the vertex to those neighbouring vertices.

According to a further aspect of the present invention, there is provided a computer program for operating a computer to enhance a digital image stored in a memory thereof as a plurality of co-ordinates defining, in three-dimensional space, the vertices of a plurality of polygonal surface facets of the image, each polygon edge joining together two vertices having at least one variable associated therewith, wherein the image is enhanced by modifying the image according to the co-ordinates of said vertices and to the values of the variables associated with said polygon edges.

Preferably computer program is arranged such that the image is modified by varying the co-ordinates of its existing vertices, the new co-ordinates of each existing vertex being determined by:

the co-ordinates the vertex itself; and the co-ordinates of vertices neighbouring the vertex, according to the values of the variables associated with each of the polygon edges which join the vertex to those neighbouring vertices.

Preferably the computer program is arranged such that image is modified by introducing new vertices between existing vertices to subdivide the polygonal facets of the image, the co-ordinates of each new vertex being determined by:

the co-ordinates of the existing vertices; and the co-ordinates of vertices neighbouring said existing vertices, according to:

the value of a variable associated with the polygon edge which joins together said existing vertices; and the values of the variables associated with the polygon edges which join said existing vertices to neighbouring vertices thereof.

Preferably the computer program is arranged such that a respective value is assigned to a variable associated with each new edge formed, that value being determined by the values of the same variable associated with existing edges in its vicinity.

Preferably the computer program is arranged such that a normal to each vertex is determined by the co-ordinates of vertices neighbouring that vertex and by the values of the variables associated with the polygon edges which join the vertex to those neighbouring vertices.

Preferably the program operates the computer to obtain the image from a remote computer.

Preferably the program operates the computer to provide for real-time manipulation, e.g. translation and rotation, of the image in three-dimensional space.

According to a further aspect of the present invention, there is provided a method for enhancing a digital image stored in a computer memory as a plurality of co-ordinates defining, in three-dimensional space, the vertices of a plurality of polygonal surface facets of the image, each polygon edge joining together two vertices having at least one variable associated therewith, wherein the image is modified according to the co-ordinates of said vertices and to the values of the variables associated with said polygon edges.

Preferably the image is modified by varying the co-ordinates of its existing vertices, the new co-ordinates of each existing vertex being determined by:

the co-ordinates the vertex itself; and the co-ordinates of vertices neighbouring the vertex, according to the values of the variables associated with each of the polygon edges which join the vertex to those neighbouring vertices.

The image may also or otherwise be modified by introducing new vertices between existing vertices to subdivide the polygonal facets of the image, the co-ordinates of each new vertex being determined by:

the co-ordinates of the existing vertices; and the co-ordinates of vertices neighbouring said existing vertices, according to:

the value of a variable associated with the polygon edge which joins together said existing vertices; and the values of the variables associated with the polygon edges which join said existing vertices to neighbouring vertices thereof.

Preferably a respective value is assigned to a variable associated with each new edge formed, that value being determined by the values of the same variable associated with existing edges in its vicinity. The method may thus be reapplied to the modified image to enhance the image still further.

A normal to each vertex is preferably determined by the co-ordinates of vertices neighbouring that vertex and by the values of the variables associated with the polygon edges which join the vertex to those neighbouring vertices.

According to a further aspect of the present invention, there is provided a computer arranged to iteratively modify data defining a digital image stored in a memory thereof, by comparing, at each iteration, an enhanced form of the image with a target image, also stored in a memory of the computer, to reduce the difference between the enhanced form of the image the target image, to thereby obtain data defining an image which, when enhanced, will approximate the target image.

According to a further aspect of the present invention, there is provided a computer program for operating a computer to iteratively modify data defining a digital image stored in a memory thereof, by comparing, at each iteration, an enhanced form of the image with a target image, also stored in a memory of the computer, to reduce the difference between the enhanced form of the image the target image, to thereby obtain data defining an image which, when enhanced, will approximate the target image.

According to a further aspect of the present invention, there is provided a method for deriving data defining an image which, when enhanced, will approximate a target image, wherein data defining an image is iteratively modified, by comparing, at each iteration, an enhanced form of the image with a target image, to reduce the difference between the enhanced form of the image the target image.

According to a further aspect of the present invention, there is provided a computer arranged to allow an operator of to interactively modify data defining a digital image stored in a memory thereof and displayed thereby in an enhanced form, to obtain data defining an image which, when enhanced, will approximate a target image.

According to a further aspect of the present invention, there is provided a computer program for operating a computer to allow an operator to interactively modify data defining a digital image stored in a memory thereof and displayed thereby in an enhanced form, to obtain data defining an image which, when enhanced, will approximate a target image.

According to a further aspect of the present invention, there is provided a method for deriving data defining an image which, when enhanced, will approximate a target image, wherein an operator of a computer interactively modifies data defining a digital image stored in a memory thereof, to obtain an enhanced display of said image which approximates said target image.

According to a further aspect of the present invention, there is provided a computer arranged to transmit to a second computer a computer program for operating said second computer to enhance a digital image stored in a memory thereof as a plurality of co-ordinates defining, in three-dimensional space, the vertices of a plurality of polygonal surface facets of the image, wherein the image is enhanced by modifying the image according to the co-ordinates of said vertices.

According to a further aspect of the present invention, there is provided a computer program for operating a computer to transmit to a second computer a computer program for operating said second computer to enhance a digital image stored in a memory thereof as a plurality of co-ordinates defining, in three-dimensional space, the vertices of a plurality of polygonal surface facets of the image, wherein the image is enhanced by modifying the image according to the co-ordinates of said vertices.

According to a further aspect of the present invention, there is provided a computer arranged to obtain from a second computer a computer program for operating said first computer to enhance a digital image stored in a memory thereof as a plurality of co-ordinates defining, in three-dimensional space, the vertices of a plurality of polygonal surface facets of the image, wherein the image is enhanced by modifying the image according to the co-ordinates of said vertices.

According to a further aspect of the present invention, there is provided a computer program for operating a computer to obtain from a second computer a computer program for operating said first computer to enhance a digital image stored in a memory thereof as a plurality of co-ordinates defining, in three-dimensional space, the vertices of a plurality of polygonal surface facets of the image, wherein the image is enhanced by modifying the image according to the co-ordinates of said vertices.

According to a further aspect of the present invention, there is provided a method for transmitting an image in a distributed computer system comprising, at a first computer:

receiving a request from a second computer for data defining said image;

establishing whether said second computer is provided with a computer program adapted to enhance said image; and if no such program is provided, transmitting such a program to said second computer.

According to a further aspect of the present invention, there is provided a computer arranged to transmit an image by receiving a request from a second computer for data defining a image, establishing whether said second computer is provided with a computer program adapted to enhance said image and, if no such program is provided, transmitting such a program to said second computer.

According to a further aspect of the present invention, there is provided a computer program for operating a computer to transmit an image by receiving a request from a second computer for data defining a image, establishing whether said second computer is provided with a computer program adapted to enhance said image and, if no such program is provided, transmitting such a program to said second computer.

According to a further aspect of the present invention, there is provided a method for obtaining an image in a distributed computer system comprising, at a first computer:

transmitting a request to a second computer for data defining said image;

responding to an interrogation by said second computer to establish whether said first computer is provided with a computer program adapted to enhance said image; and if no such program is provided, receiving such a program from said second computer.

According to a further aspect of the present invention, there is provided a computer arranged to obtain an image by transmitting a request to a second computer for data defining said image, responding to an interrogation by said second computer to establish whether said first computer is provided with a computer program adapted to enhance said image and, if no such program is provided, receiving such a program from said second computer.

According to a further aspect of the present invention, there is provided a computer program for operating a computer to obtain an image by transmitting a request to a second computer for data defining said image, responding to an interrogation by said second computer to establish whether said first computer is provided with a computer program adapted to enhance said image and, if no such program is provided, receiving such a program from said second computer.

Embodiments of the present invention will now be described by way of examples only and with reference to the accompanying drawings, in which.

Figure 1:
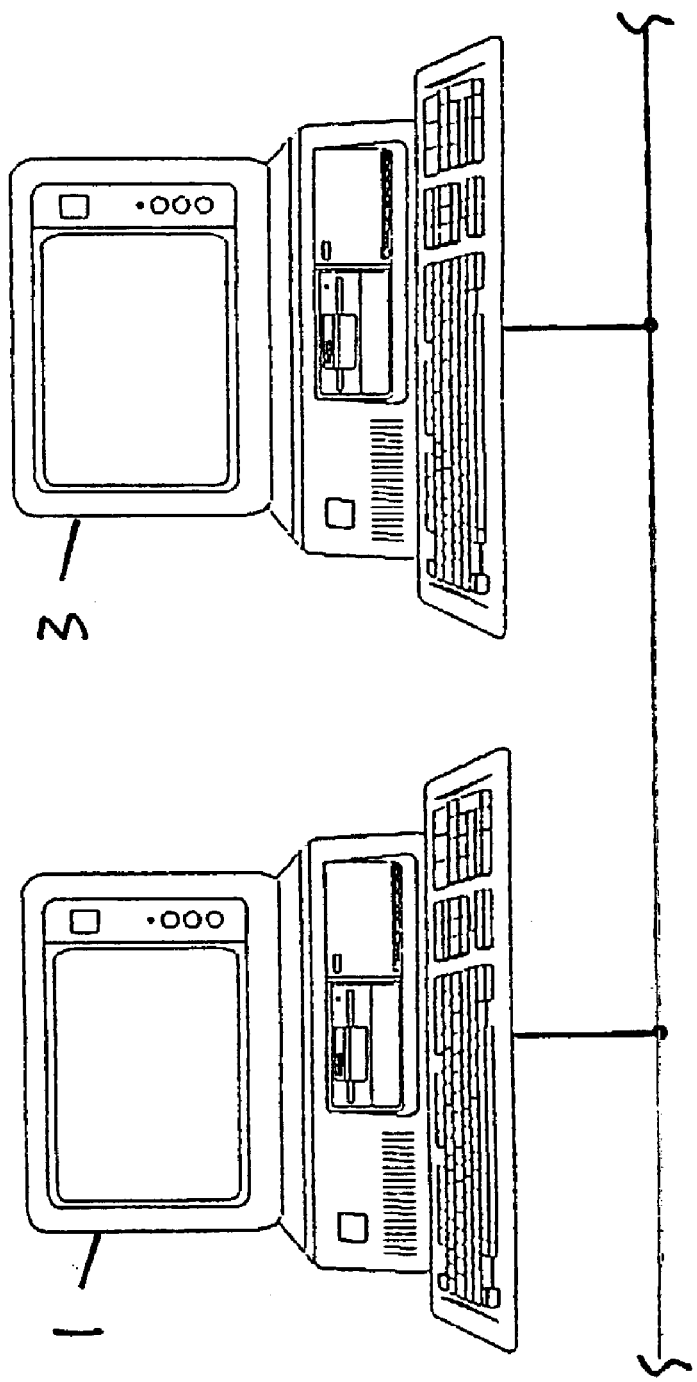
FIG. 1 is a schematic diagram of a distributed computer system in accordance with the present invention.

Referring to FIG. 1 of the drawings, a distributed computer network is shown comprising two interconnected computers 1,3. According to the present invention, the second computer 3 might transmit a request to the first 1 computer for an image stored in a memory thereof, for three dimensional manipulation of an enhanced form of the image on a display screen the second computer. Prior to, or subsequent to, transmitting the requested image, the first computer 1 would preferably interrogate the second computer 3 to determine whether the latter 3 was provided with software suitable for receiving and enhancing the requested image and if it was not, would transmit such software to the second computer together with the requested image.

Figure 2:
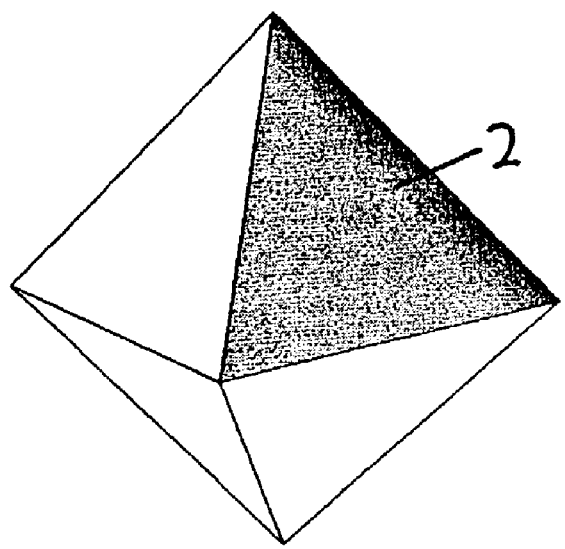
FIG. 2 is a reduced complexity image made up of a plurality of surface polygons.

FIG. 2 shows an image comprising a plurality of triangular surface facets which, in accordance with the present invention, might be transmitted from the first computer 1 to the second computer 3 as a plurality of three-dimensional co-ordinates each corresponding with a respective vertex of the image.

Figure 3:
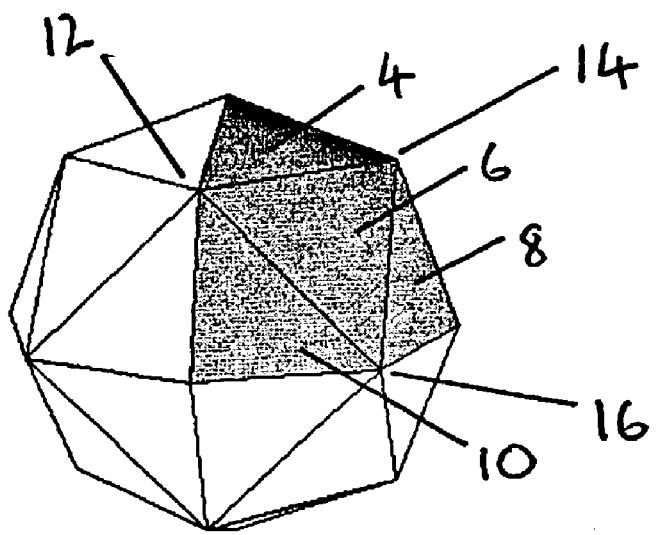
FIG. 3 is a modified image derived from that of FIG. 2.

The receiving computer 3 would enhance the image for display by varying the co-ordinates of existing vertices and by introducing new vertices between existing vertices to further subdivide the surface facets as shown in FIG. 3. For each triangular facet in the original image, e.g. facet 2 in FIG. 2, four new triangular facets 4,6,8 and 10 are formed by joining together three new vertices 12,14 and 16, which are introduced along respective edges of the original facet.

Figure 4:
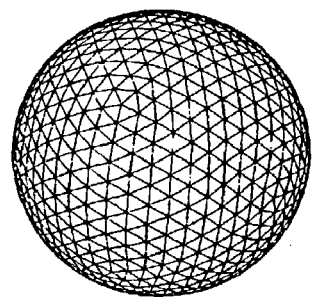
FIG. 4 is a sequence of images of increasing surface definition.
Figure 4:
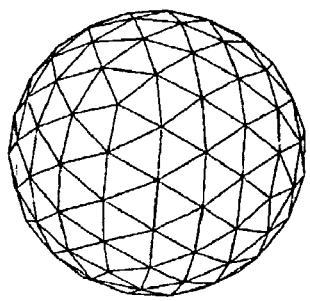
Figure 4:
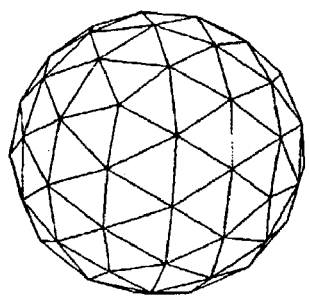
Figure 4:
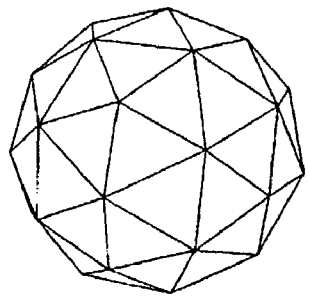
Figure 4:
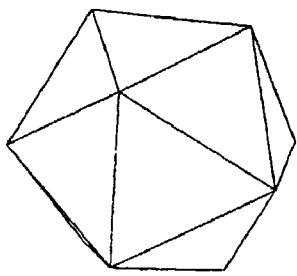

By repeatedly subdividing the surface of the image, as shown in FIG. 4, the surface definition of the image may be increased to the point where the image surface appears substantially continuous, the so-called "limit surface".

It will be appreciated that by transmitting and then enhancing the display of a reduced complexity image, a considerable amount of time can be saved over that which would be required to transmit an equivalent high complexity image stored in a known format, for example as a bit-map image. Once received, the image may also be readily manipulated, for example by translation or rotation thereof in real time.

However, we have found that enhancement techniques, which modify an image according to vertex co-ordinates alone, are limited in that their application tends to result in undesirable surface artefacts in the displayed image.

Figure 6:
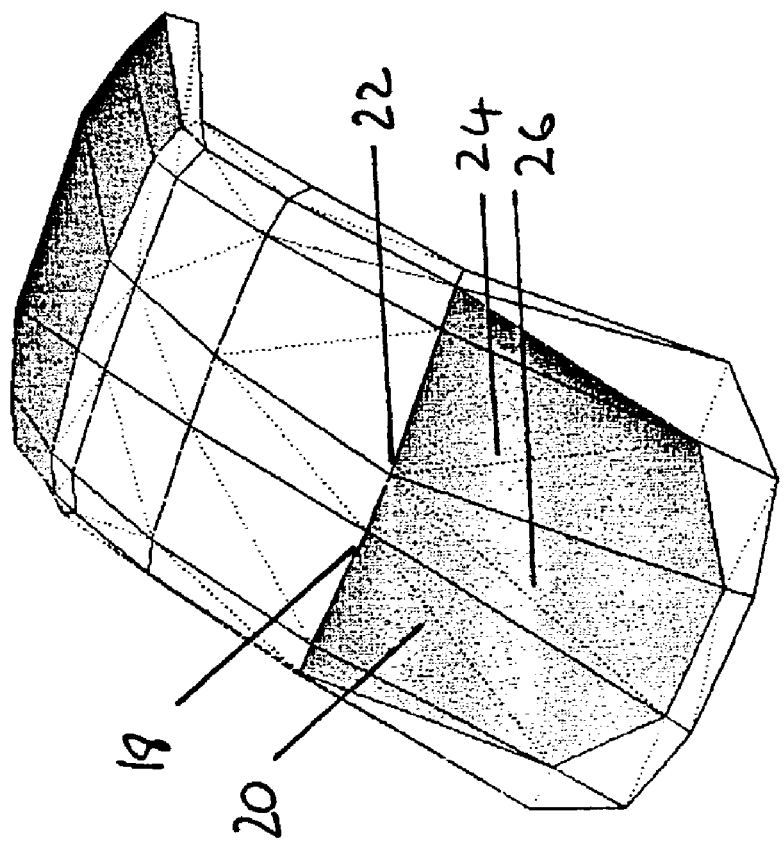
FIG. 6 is the image of FIG. 5 shown divided into a plurality of triangular surface facets.
Figure 5:
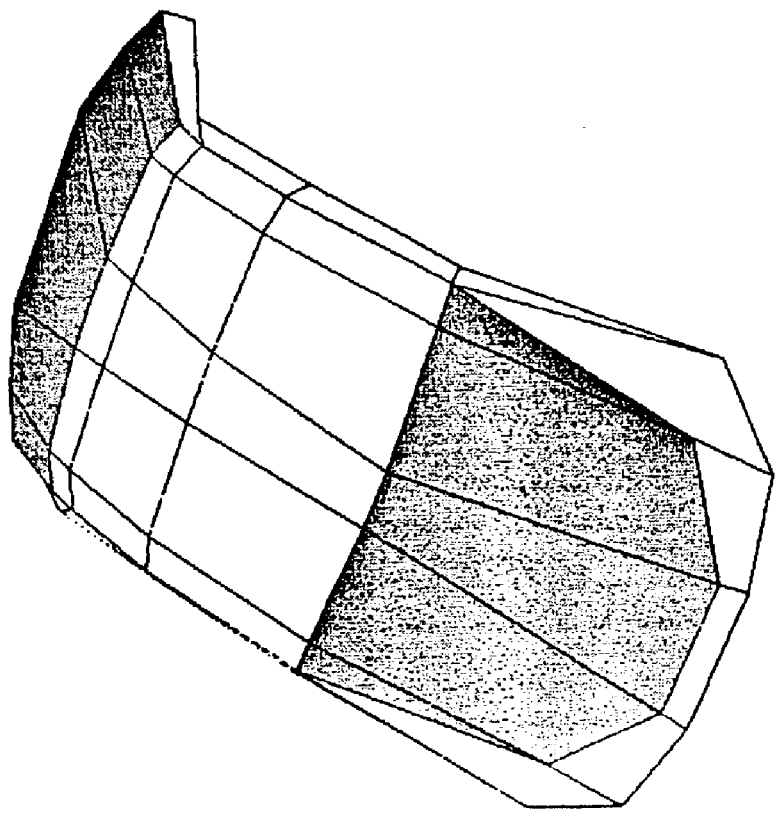
FIG. 5 is a second reduced complexity image made up of a plurality of rectangular polygons.

As an example, an image of a car windscreen is shown in FIG. 5. In order to enhance the image, the four-sided polygons which make up the surface of the image are each divided, as shown in FIG. 6, into two triangular facets.

Figure 8:
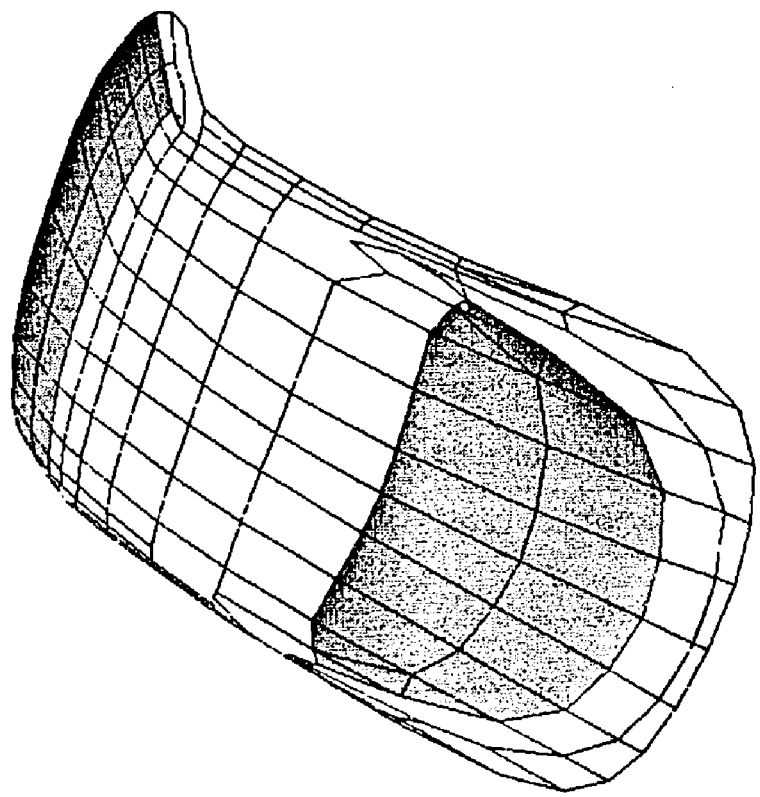
FIG. 8 is a modified image derived from that of FIG. 6 according to the present invention.
Figure 7:
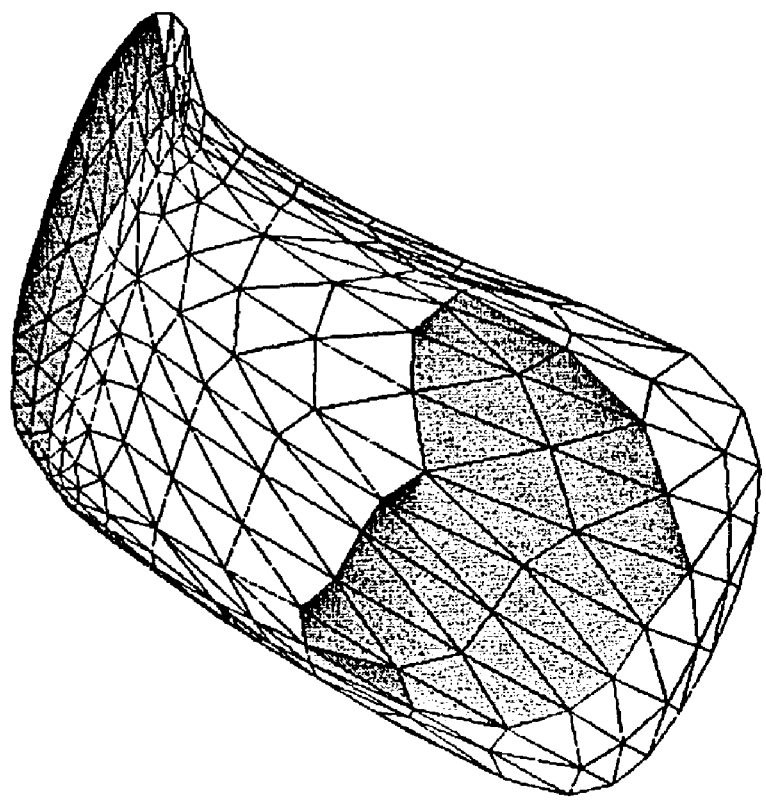
FIG. 7 is a modified image derived from that of FIG. 6 according to a prior art method.

It will be noted that after triangulation, the vertex 18 has only one polygon edge 20 radiating downwards from it, whereas the corresponding vertex 22 on the opposite side of the image has two polygon edges 24,26 extending downwards from it.

Where an enhancement algorithm based on vertex co-ordinates alone is applied to the triangulated image, the result is to skew the image as shown in FIG. 7. The preferred algorithm described below, on the other hand, when applied to the image of FIG. 6, will produce the correct image shown in FIG. 8.

According to the present invention, undesirable distortion of an image is preferably avoided by associating, with each polygon edge, a characteristic which determines how the co-ordinates of its neighbouring vertices will be modified.

In more detail, the preferred method enhances the display of an image by varying the co-ordinates of existing vertices and introducing new vertices as follows—

Each edge in the image has two variables associated with it. The first variable can take one of two values according to whether the edge is sharp or smooth. The second variable can also take one of two values according to whether the edge is visible or invisible, sharp edges being always also visible.

In the present example, the polygon edges shown in FIG. 5 would be designated as being visible, whereas the triangulation lines introduced in FIG. 6 would be designated as being invisible.

Figure 9:
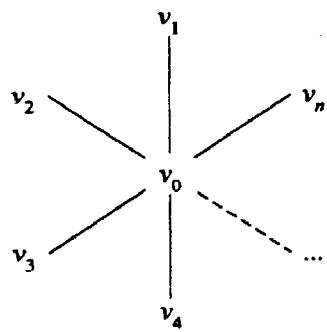
FIG. 9 is a schematic showing the polygon edges which join an existing vertex to its neighbouring vertices.
Figure 10:
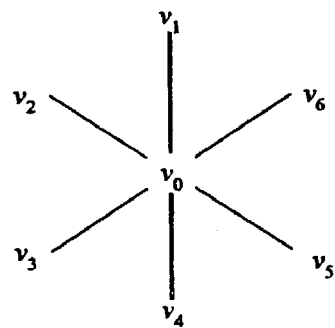
FIG. 10 is a second schematic showing the polygon edges which join an existing vertex to its neighbouring vertices.

With reference to FIGS. 9 and 10, the new co-ordinates of each existing vertex are determined by the visibility and sharpness of the polygon edges projecting from it.

The visibility and sharpness of the edges influence the effect that the co-ordinates $v_0$ of the vertex itself have, and the effect that the co-ordinates $v_1, \ldots, v_n$ of the vertices at the opposite ends of visible edges radiating from that vertex have, on the new co-ordinates of the vertex, according to the following rules—

If no edges surrounding the point are sharp, as shown in FIG. 9, it is a smooth vertex. To obtain the new co-ordinates of a vertex, all of the neighbouring vertices $v_1$ to $v_n$ to which the vertex is joined by visible polygon lines are averaged with weight 1 each, and the vertex itself, $v_0$, is added with weight $\alpha(n)$, where n is the number of visible neighbours:

$$v_{new} = \frac{\alpha(n)v_0 + v_1 + v_2 + v_3 + \ldots + v_n}{n + \alpha(n)}$$

The factor $\alpha(n)$ is defined as:

$$\alpha(n) = \frac{n(1 - a(n))}{a(n)}$$

Where a(n) is defined as:

$$a(n) = \frac{5}{8} - \frac{(3 + 2\cos(2\pi/n))^2}{64}$$

For a vertex that has a single sharp edge, the same weighting is used.

For a vertex having exactly two sharp edges in its neighborhood, as shown in FIG. 10, the vertex $v_0$ itself is given weight 6, and the two sharp neighborhood points (e.g. in FIG. 10, vertices $v_1$ and $v_4$) are given weight 1. The other points in the neighborhood have no effect.

$$v_{new} = \frac{6v_0 + v_1 + v_4}{8}$$

The co-ordinates of vertices having more than two sharp edges in their neighborhood are unchanged.

$$v_{new} = v_0$$

Figure 11:
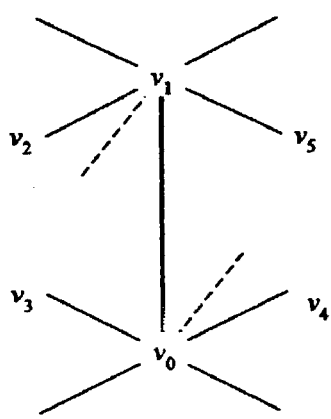
FIG. 11 is a third schematic showing the polygon edges which join together two existing vertices and which join each of the two existing vertices to its remaining neighbouring vertices.

Similarly, and with reference to FIG. 11, the co-ordinates of a new vertex introduced along an edge are determined by the co-ordinates of the vertices in its neighbourhood according to whether the edge is sharp or not.

The co-ordinates of the new vertex are determined by those of the existing vertices at each end of the edge ($v_0$ and $v_1$), and those of the vertices on the nearest visible edges to the left and right at each end ($v_2$, $v_3$, $v_4$ and $v_5$). In some cases, these edges will connect to the same vertex—in a triangular mesh, for instance, $v_2$ is $v_3$, and $v_4$ is $v_5$. In this case, each doubly connected vertex is counted twice, once for each role it plays.

For a visible smooth edge, the position of the new vertex is a weighted average of all the vertices, with the original edge vertices $v_0$ and $v_1$ weighted with a value of 6 each, and the remaining vertices weighted as 1 each.

$$v_{new} = \frac{6v_0 + 6v_1 + v_2 + v_3 + v_4 + v_5}{16}$$

For an invisible smooth edge, these nearest visible neighbour vertices are weighted in the same way, but the original edge vertices are only given weight 2 each.

$$v_{new} = \frac{2v_0 + 2v_1 + v_2 + v_3 + v_4 + v_5}{8}$$

For a sharp edge, only the edge vertices are considered, with their weights determined by the total number of visible edges n and m in their respective neighborhoods.

$$v_{new} = \frac{nv_0 + mv_1}{n + m}$$

In order to perform operations such as lighting on a surface, it is necessary to determine the normal to that surface at each vertex. This is the direction at right angles to the limit surface at that point.

In order to obtain this, it is necessary first to obtain two tangent vectors, $t_1$ and $t_2$, which are directions that lie along the surface rather than at right angles to it. Given these, a vector cross product will result in the desired normal:

$$n = t_1 \times t_2$$

For a smooth vertex, with no sharp edges, or one with a single sharp edge, the tangents are weighted averages of the positions of the neighbourhood vertices. Referring again to FIG. 9, each of the n neighbourhood vertices $v_i$ ($v_1$, $v_2$, up to $v_n$), is given a corresponding weight $c_i$ ($c_1$, $c_2$ up to $c_n$). The weights are calculated using:

$$c_i = \cos(2\pi i/n)$$

The two tangent vectors are then:

$$t_1 = c_1 v_1 + c_2 v_2 + c_3 v_3 + \ldots + c_n v_n$$

$$t_2 = c_2 v_1 + c_3 v_2 + c_4 v_3 + \ldots + c_1 v_n$$

For a vertex with two sharp edges, the sharp edges represent a dividing line between a region on the left, which has a definite normal, and a region on the right, which has a separate normal. (For a boundary edge, one of these regions is missing completely.) Referring again to FIG. 10, the left region consists of vertices $v_1$, $v_2$, $v_3$ and $v_4$. The right hand region consist of vertices $v_4$, $v_5$, $v_6$ and $v_1$.

In general, in the region to the left of the sharp edge, there are m vertices, from $v_1$ at one end of the sharp crease, in order through $v_2$, $v_3$, etc. for the non-sharp edges, finally round to $v_m$ which is at the other end of the sharp crease.

The tangent vector $t_1$ along the sharp edge is given by the difference between the start and end points of the sharp edge, i.e.:

$$t_1 = v_1 - v_m$$

The tangent $t_2$ across the sharp edge on one side is determined by yet another weighed average of the vertices on the side of interest.

For m=2 $t_2 = -2v_0 + v_1 + v_2$

For m=3 $t_2 = v_2 - v_0$

For m=4 $t_2 = -2v_0 - v_1 + 2v_2 + 2v_3 - v_4$

If m is more than 4, each vertex $v_i$ is weighted with a weight $w_i$ such that the sharp edge $w_1$ and $w_m$ are:

$$w_1 = w_m = \sin \theta$$

The other points $v_2$ to $v_{m-1}$ are weighted as $$w_i = (2 \cos \theta - 2) \sin((i-1)\theta)$$

Where $$\theta = \frac{\pi}{m-1}$$

The tangent $t_2$ is then:

$$t_2 = w_1 v_1 + w_2 v_2 + w_3 v_3 + \ldots + w_m v_m$$

Once again, the normal is obtained as the cross product of these two tangents.

Figures 12, 13:
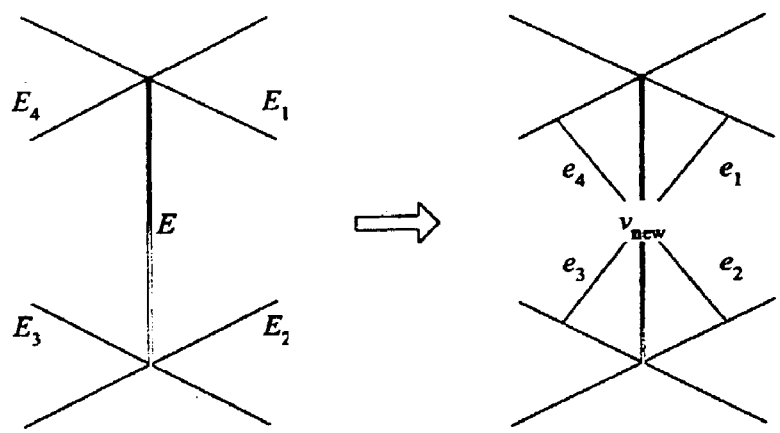
FIG. 12 is a fourth schematic showing a first example of how new polygon edges may be formed in accordance with the present invention.
FIG. 13 is a corresponding first look up table for determining at least one characteristic to be associated with a new polygon edge.

The visibility of the new edges needs to be determined, if the enhancement method is to be re-applied. In the example shown in FIG. 12, the introduction of a new vertex creates new edges. The visibility of each of these edges is determined according to visibility of other edges in its vicinity.

Two edges will be the two halves of the original edge E, which edges keep the visibility of the original edge.

Of the remaining four new edges, two edges will be to the right hand side of the original edge, and two more to its left. These new edges, labelled clockwise as $e_1$, $e_2$, $e_3$ and $e_4$, connect to other new points created by dividing the original edges labelled $E_1$, $E_2$, $E_3$ and $E_4$. The visibility of each new edge is found by looking up which combination of E, $E_1$, $E_2$, $E_3$ and $E_4$ are visible using the lookup table in FIG. 13.

Figures 14, 15:
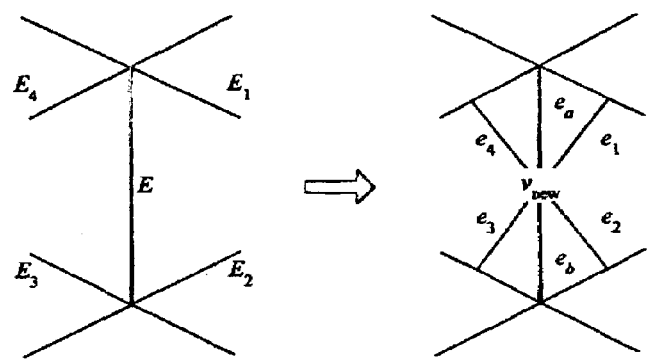
FIG. 14 is a fifth schematic showing a second example of how new polygon edges may be formed in accordance with the present invention.
FIG. 15 is a corresponding second look up table for determining at least one characteristic to be associated with a new polygon edge.

In the alternative example shown in FIG. 14, the introduction of a new vertex again creates new edges, and the visibility of each of these edges is again determined according to visibility of other edges in its vicinity.

In this case, two edges will be the two halves of the original edge E, which are labelled $e_a$ and $e_b$.

As before, of the remaining four new edges, two edges will be to the right hand side of the original edge, and two more to its left. These new edges, labelled clockwise as $e_1$, $e_2$, $e_3$ and $e_4$, connect to other new points created by dividing the original edges labelled $E_1$, $E_2$, $E_3$ and $E_4$. The visibility of each new edge is now found in this example by looking up which combination of E, $E_1$, $E_2$, $E_3$ and $E_4$ are visible using the lookup table in FIG. 15.

In each case, in order to obtain an appropriate digital image for transmission, that will produce a desired target image when enhanced at a receiving computer according to a pre-determined enhancement algorithm (such as the preferred algorithm described above), a set of data defining the image to be transmitted may be iteratively modified by comparing, at each iteration, the enhanced image resulting from an application of the algorithm to that data with the target image, and modifying the data to reduce the difference between the two images.

The data may be modified manually, for example by the operator of a computer, who compares a display of the enhanced image with a display of the target image and adjusts the data by means of an interface device such as a mouse.

Alternatively, the data may be modified automatically using an error minimisation algorithm, such as a gradient-descent error minimisation algorithm or a genetic algorithm.

Although the embodiments of the invention described with reference to the accompanying drawings comprise computer apparatus and processes performed in and by computer apparatus, the invention also extends to computer programs, particularly computer programs on or in a carrier, adapted for putting the invention into practice. The program may be in the form of source code, object code, a code intermediate source and object code (such as in a partially compiled form) or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic storage medium, for example a floppy disc or hard disc. Further, the carrier may be a transmissible carrier such as an electrical or optical signal, which may be conveyed via electrical or optical cable or by radio or other means.

When the program is embodied in a signal, which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The processes, apparatus and computer programs thus described provide effective means for rapidly distributing and displaying digital images.

The invention claimed is:

1. A method for enhancing a digital image stored in a computer memory as a plurality of co-ordinates defining, in three-dimensional space, the vertices of a plurality of polygonal surface facets of the image, each polygon edge joining together two vertices having at least one variable associated therewith, the method comprising:

modifying the image by introducing new vertices between existing vertices to subdivide the polygonal facets of the image;

determining the co-ordinates of each new vertex by the co-ordinates of the existing vertices and the co-ordinates of vertices neighboring said existing vertices according to the value of a variable associated with the polygon edge which joins together said existing vertices and the values of the variables associated with the polygon edges which join said existing vertices to neighboring vertices thereof;

assigning a respective value to a variable associated with each new edge formed;

determining the respective value by the values of the same variable associated with existing edges in its vicinity;

determining the new co-ordinates of each existing vertex by the visibility and sharpness of the polygon edges projecting from it;

displaying the enhanced digital image.

2. A method as claimed in claim 1, wherein the image is modified by varying the co-ordinates of its existing vertices, the new co-ordinates of each existing vertex being determined by:

the co-ordinates the vertex itself; and the co-ordinates of vertices neighboring the vertex, according to the values of the variables associated with each of the polygon edges which join the vertex to those neighboring vertices.

3. A computer arranged to receive, via a telecommunications link, a plurality of co-ordinates defining, in three-dimensional space, the vertices of a plurality of polygonal surface facets of an image, and to enhance the image by modifying the image according to the co-ordinates of said vertices: wherein at least one variable is associated with each polygonal edge joining together two vertices and the image is modified according to the values of those variables; and wherein the image is modified by introducing new vertices between existing vertices to subdivide the polygonal facets of the image, the co-ordinates of each new vertex being determined by the co-ordinates of the existing vertices and the co-ordinates of vertices neighboring said existing vertices according to the value of a variable associated with the polygon edge which joins together said existing vertices and the values of variables associated with the polygon edges which join said existing vertices to neighboring vertices thereof, wherein a respective value is assigned to a variable associated with each new edge formed, that value being determined by the values of the same variable associated with existing edges in its vicinity and wherein the new co-ordinates of each existing vertex are determined by the visibility and sharpness of the polygon edges projecting from it for displaying the enhanced digital image.

4. A computer as claimed in claim 3, wherein the image is modified by varying the co-ordinates of its existing vertices, the new co-ordinates of each existing vertex being determined by:

the co-ordinates the vertex itself; and the co-ordinates of vertices neighboring the vertex, according to the values of at least one respective variable associated with each of the polygon edges which join the vertex to those neighboring vertices.

5. A distributed computer system comprising a first computer and a second computer, the distributed computer system arranged for a digital image to be transmitted from the first computer to the second computer, via a telecommunications link, as a plurality of co-ordinates defining, in dimensional space, the vertices of a plurality of polygonal surface facets of the image, wherein: the second computer is arranged to enhance the image by modifying the image according to the co-ordinates of said vertices; wherein at least one variable is associated with each polygonal edge joining together two vertices and the image is modified according to the values of those variables; and wherein the image is modified by introducing new vertices between existing vertices to subdivide the polygonal facets of the image; the co-ordinates of each new vertex being determined by the co-ordinates of the existing vertices; and the co-ordinates of vertices neighboring said existing vertices according to the value of a variable associated with the polygon edge which joins together said existing vertices and the values of the variables associated with the polygon edges which join said existing vertices to neighboring vertices thereof, wherein a respective value is assigned to a variable associated with each new edge formed, that value being determined by the values of the same variable associated with existing edges in its vicinity and wherein the new co-ordinates of each existing vertex are determined by the visibility and sharpness of the polygon edges projecting from it for displaying the enhanced digital image.

6. A distributed computer system as claimed in claim 5, wherein a normal to each vertex is determined by the co-ordinates of vertices neighboring that vertex and by the values of the variables associated with the polygon edges which join the vertex to those neighboring vertices.

7. A distributed computer system as claimed in claim 5, wherein initial values are assigned to at least one of: the variables associated with the polygon edges by the second computer; and the variables associated with the polygon edges are transmitted from the first computer to the second computer.

8. A computer program embodied on a computer storage medium for operating a computer to receive, via a telecommunications link, a plurality of co-ordinates defining, in three-dimensional space, the vertices of a plurality of polygonal surface facets of an image, and to enhance the image by modifying the image according to the co-ordinates of said vertices, wherein the image is modified by introducing new vertices between existing vertices to subdivide the polygonal facets of the image, the co-ordinates of each new vertex being determined by the co-ordinates of the exiting vertices and the co-ordinates of vertices neighboring said existing vertices, according to the value of a variable associated with the polygon edge which joins together said existing vertices and the values of variables associated with the polygon edges which join said existing vertices to neighboring vertices thereof, wherein a respective value is assigned to a variable associated with each new edge formed, that value being determined by the values of the same variable associated with existing edges in its vicinity and wherein the new co-ordinates of each existing vertex are determined by the visibility and sharpness of the polygon edges projecting from it for displaying the enhanced digital image.

9. A computer program embodied on a computer storage medium as claimed in claim 8, wherein a normal to each vertex is determined by the co-ordinates of vertices neighboring that vertex and by the values of variables associated with the polygon edges which join the vertex to those neighboring vertices.

10. A method as claimed in claim 1 wherein a normal to each vertex is determined by the co-ordinates of vertices neighboring that vertex and by the values of the variables associated with the polygon edges which join the vertex to those neighboring vertices.

11. A computer as claimed in claim 3 wherein a normal to each vertex is determined by the co-ordinates of vertices neighboring that vertex and by the values of variables associated with the polygon edges which join the vertex to those neighboring vertices.

12. A distributed computer system as claimed in claim 5 wherein the image is modified by varying the co-ordinates of its existing vertices, the new co-ordinates of each existing vertex being determined by: the co-ordinates of the vertex itself; and the co-ordinates of vertices neighboring the vertex according to the values of the variables associates with each of the polygon edges which join the vertex to those neighboring vertices.

* * * * *

UNITED STATES PATENT AND TRADEMARK OFFICE
CERTIFICATE OF CORRECTION

| | | |
|---|---|---|
| PATENT NO. | : 7,136,065 B1 | Page 1 of 1 |
| APPLICATION NO. | : 10/129451 | |
| DATED | : November 14, 2006 | |
| INVENTOR(S) | : Jonathan Gordon Grove et al. | |

It is certified that error appears in the above-identified patent and that said Letters Patent is hereby corrected as shown below:

Column 14, line 4, delete "dimensional" and insert --three-dimensional--.

Signed and Sealed this

Twenty-third Day of January, 2007

JON W. DUDAS
*Director of the United States Patent and Trademark Office*